Figure 5:
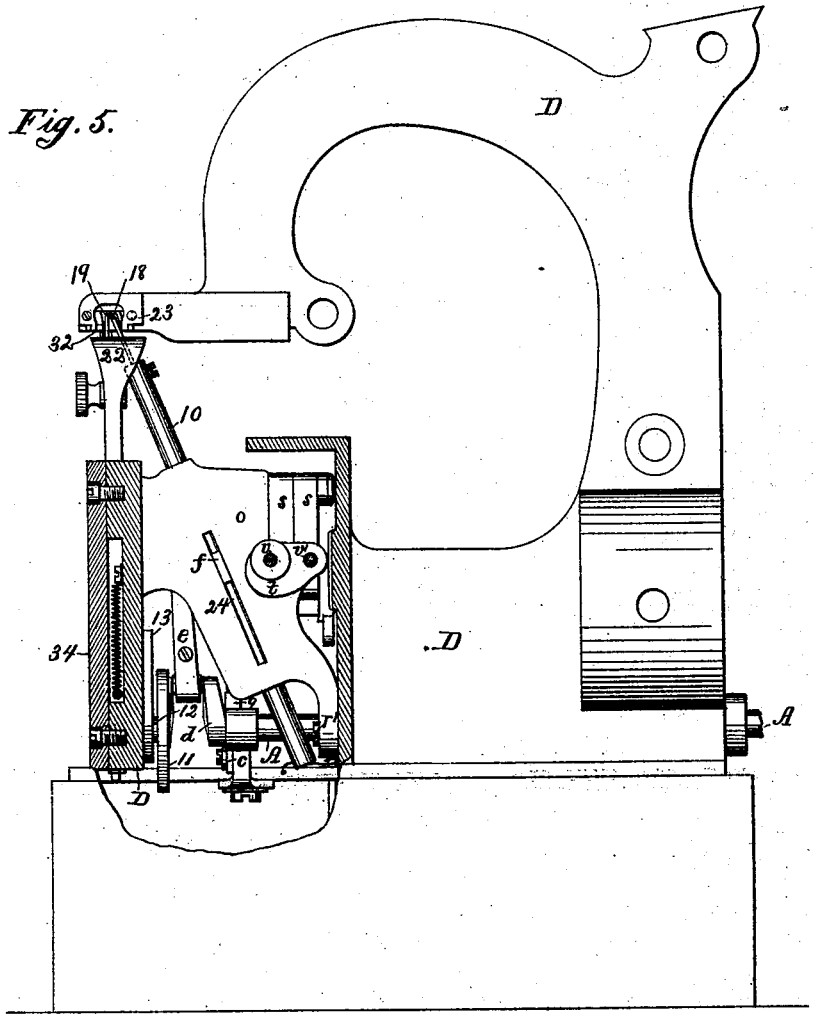

(Model.)
7 Sheets—Sheet 1.
J. H. MORLEY.
Machine for Sewing Buttons on Fabrics, &c.
No. 236,350.                    Patented Jan. 4, 1881.
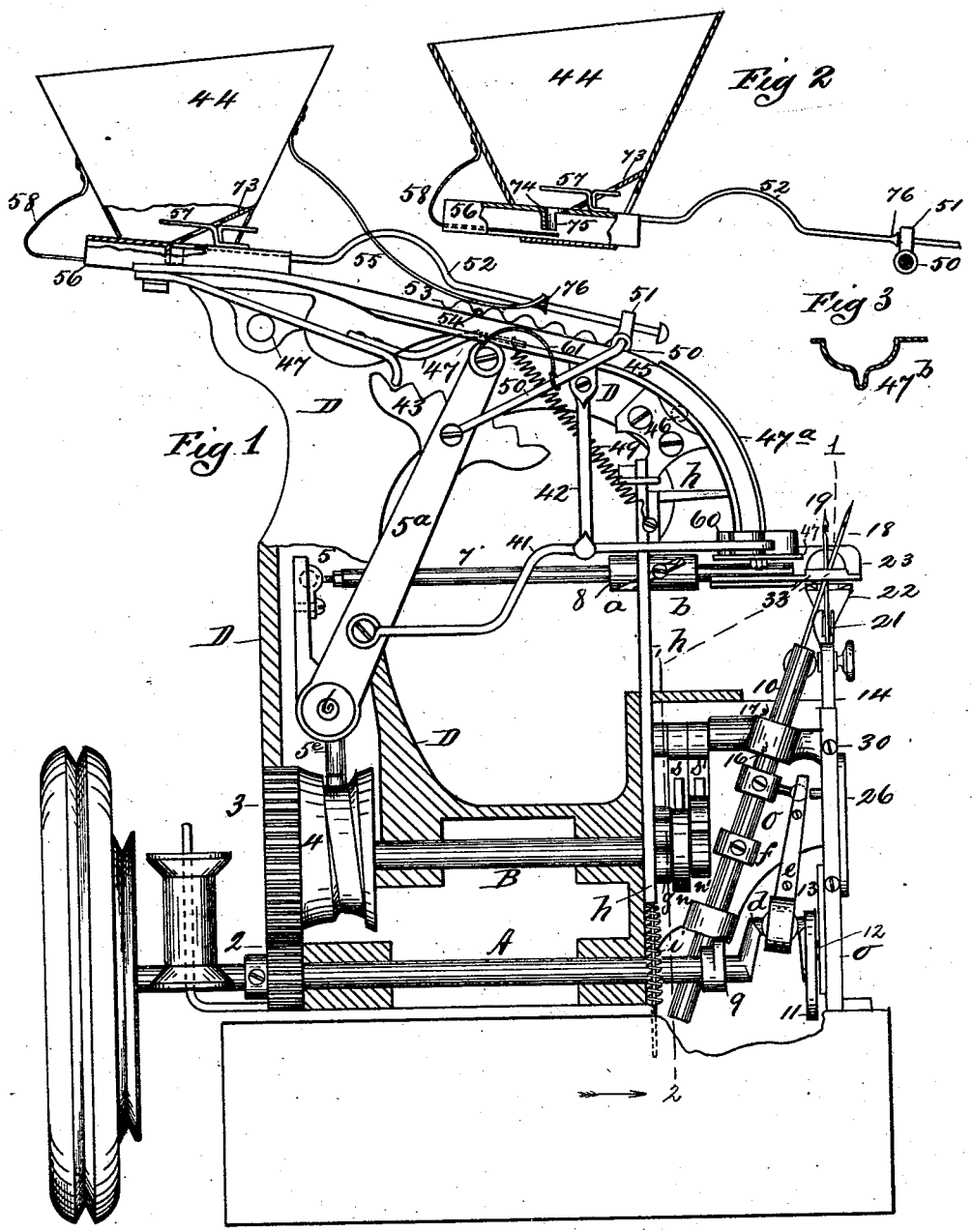
Witnesses
Wm H Chapin
G. Bill
Inventor
James H Morley
By Henry A Chapin
Attorney

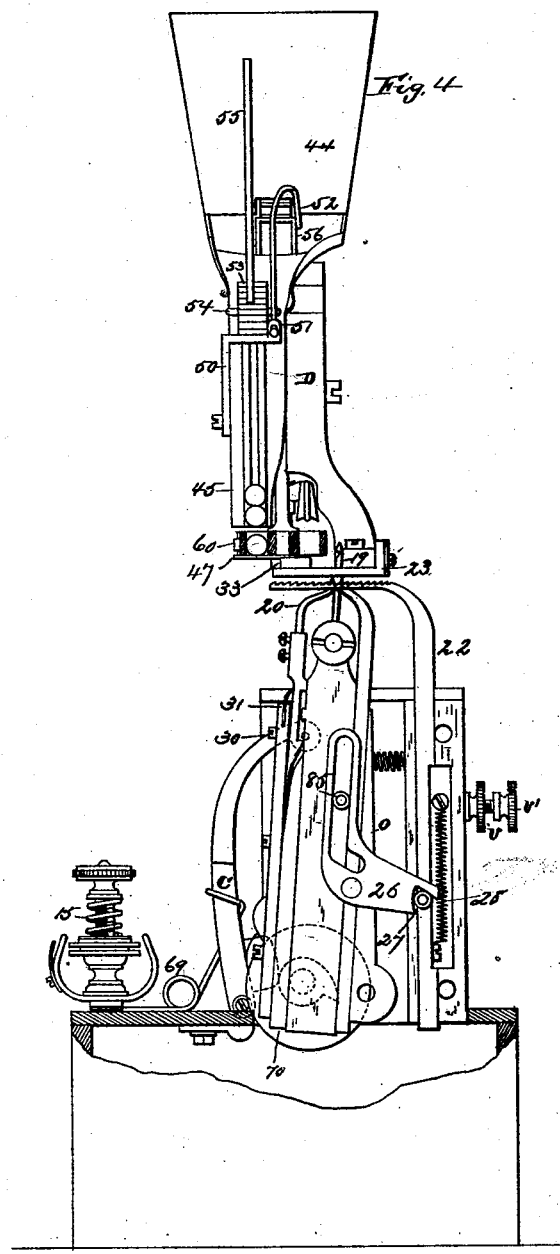

(Model.)

7 Sheets—Sheet 3.

J. H. MORLEY.
Machine for Sewing Buttons on Fabrics, &c.

No. 236,350. Patented Jan. 4, 1881.

Witnesses:—
Courtney A. Cooper
William Paxton.

Jas. H. Morley
By his Attorneys
H. A. Chapin

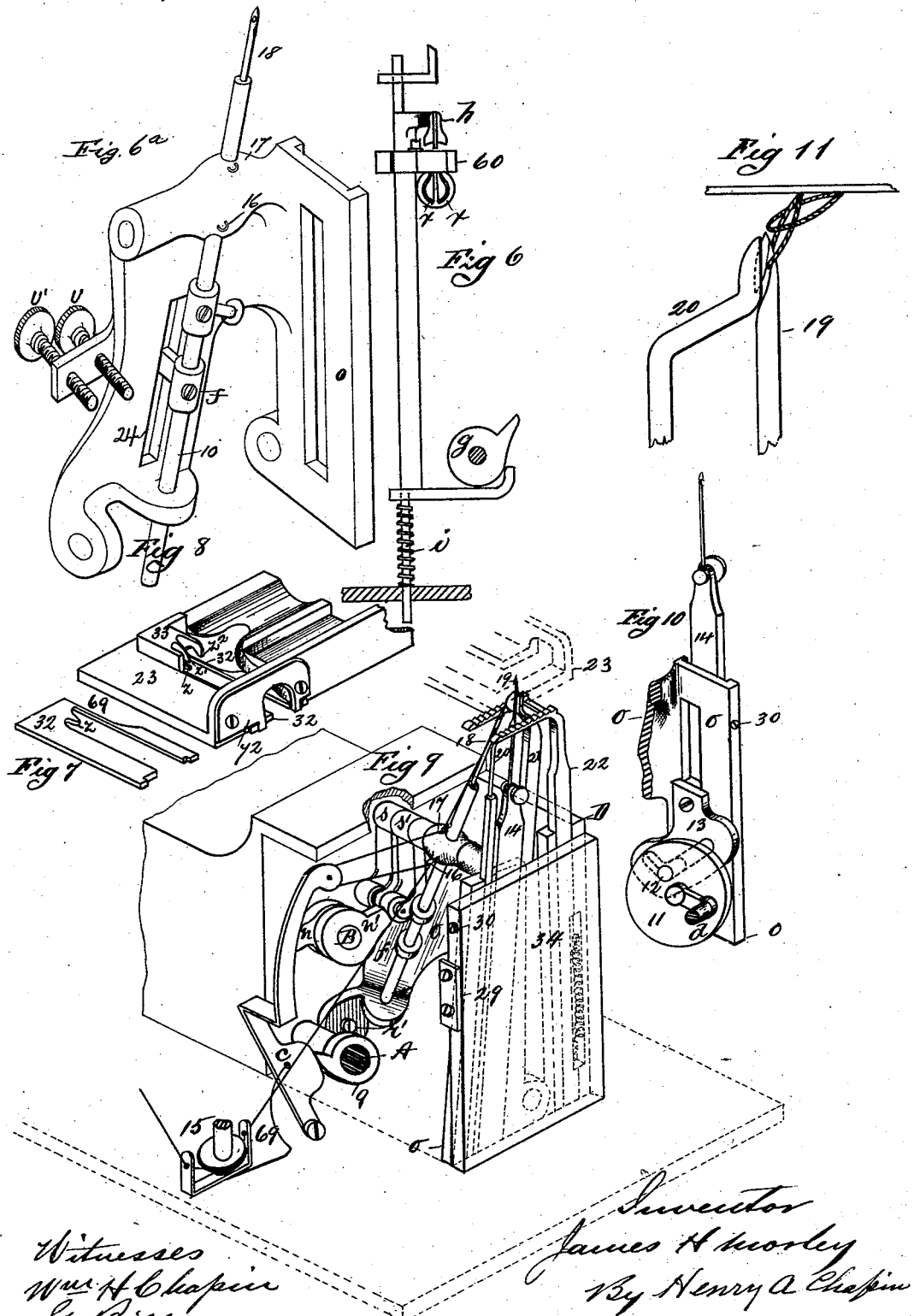

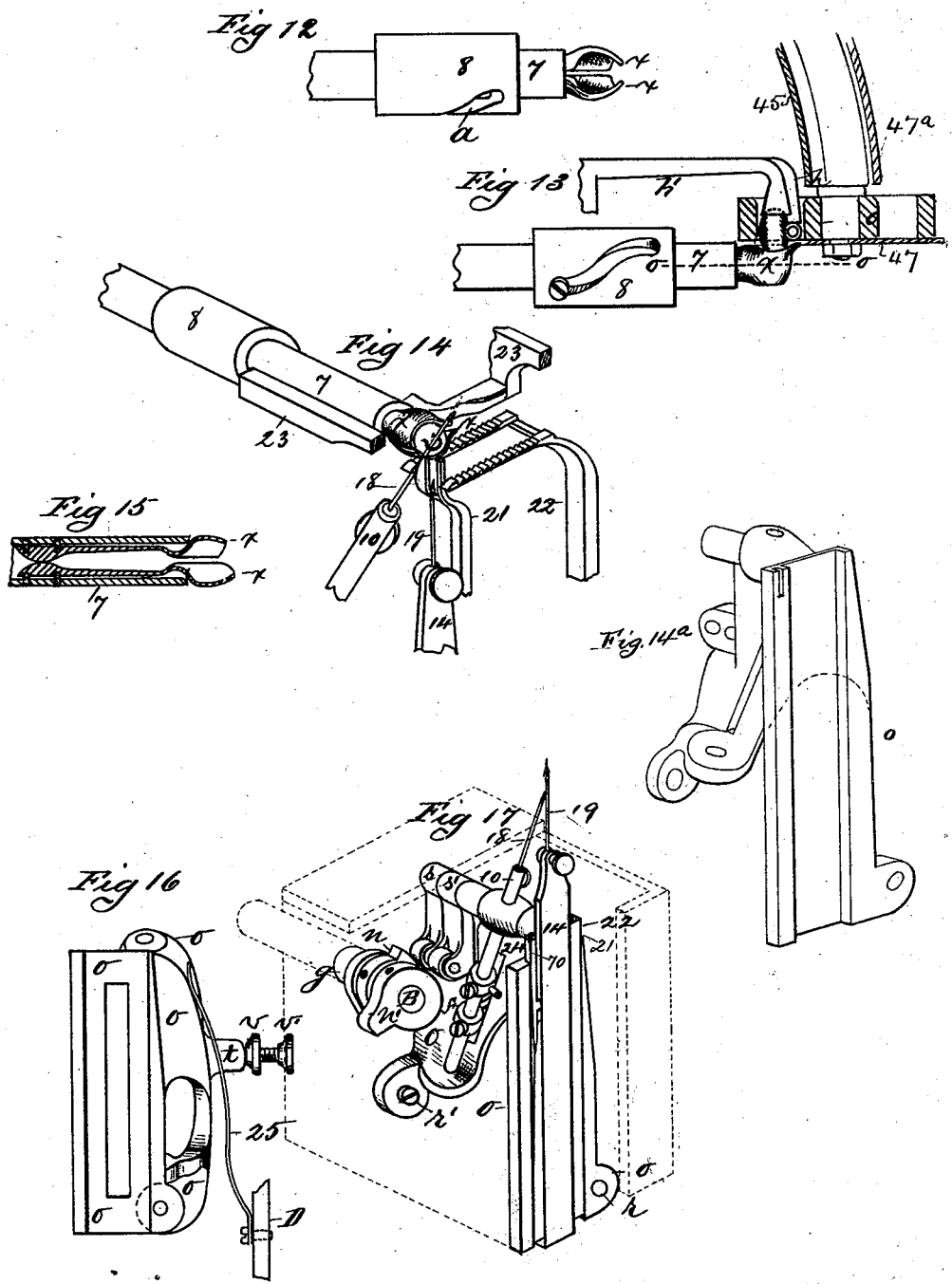

(Model.)  7 Sheets—Sheet 6.
J. H. MORLEY.
Machine for Sewing Buttons on Fabrics, &c.
No. 236,350. Patented Jan. 4, 1881.
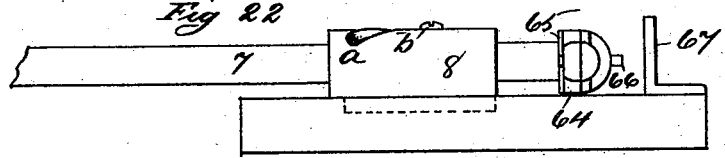
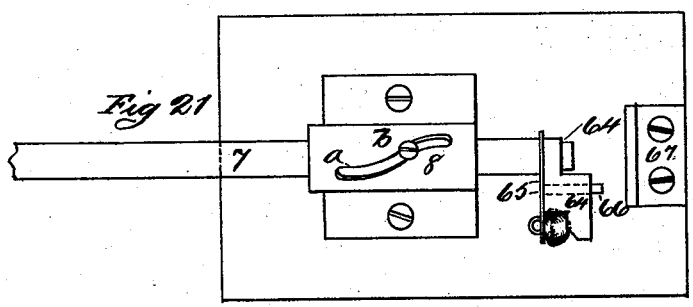
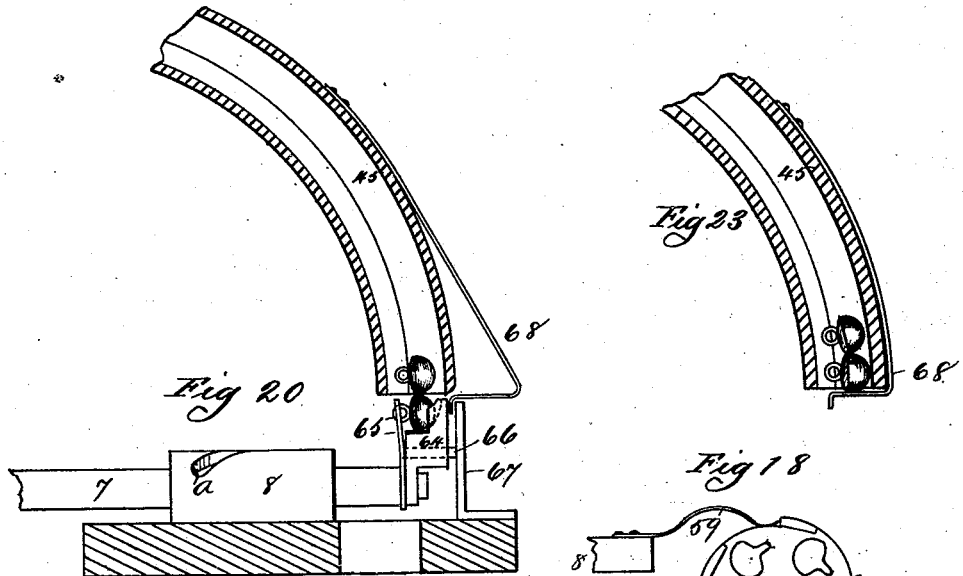
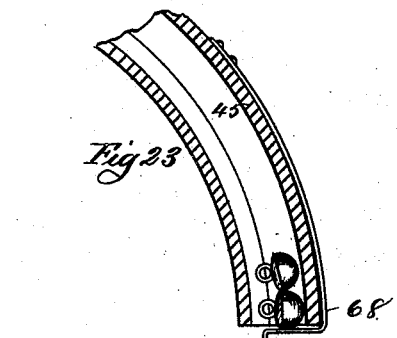
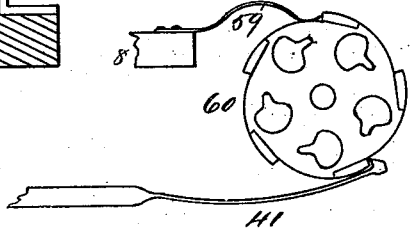
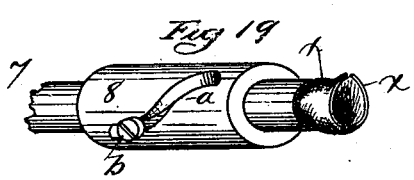
N. PETERS, PHOTO-LITHOGRAPHER, WASHINGTON, D. C.

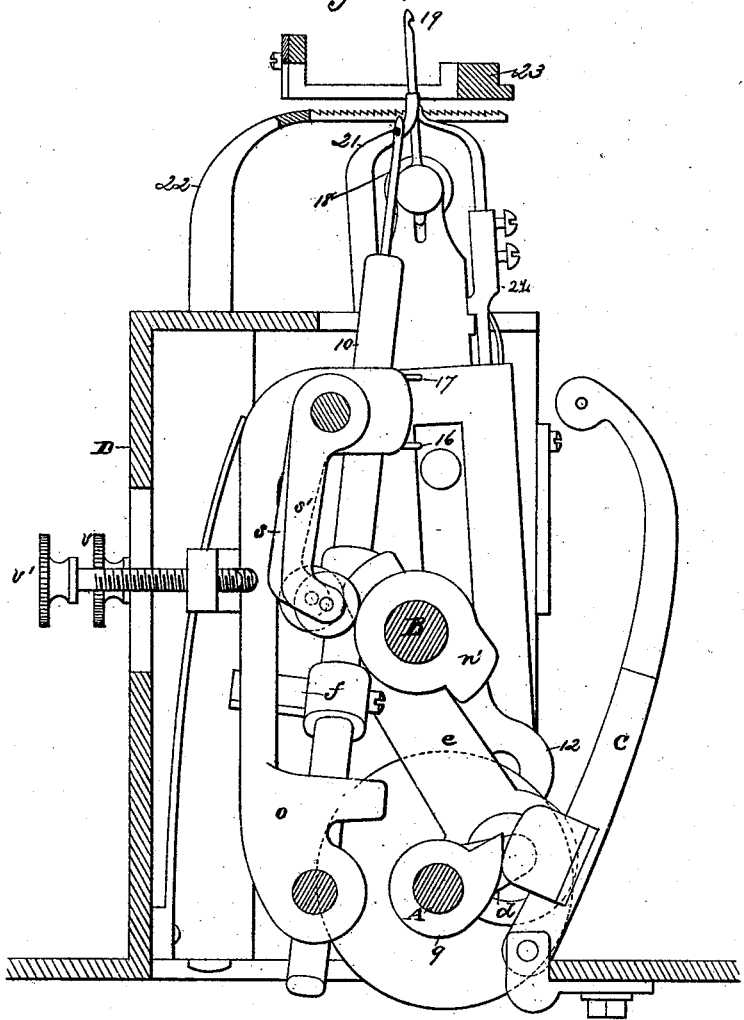

UNITED STATES PATENT OFFICE.

JAMES H. MORLEY, OF HOLYOKE, MASSACHUSETTS, ASSIGNOR OF TWO-THIRDS TO E. S. FAY, OF PORTSMOUTH, NEW HAMPSHIRE, AND HENRY E. WILKINS, OF SPRINGFIELD, MASSACHUSETTS.

MACHINE FOR SEWING BUTTONS ON FABRICS, &c.

SPECIFICATION forming part of Letters Patent No. 236,350, dated January 4, 1881.

Application filed June 23, 1880. (Model.)

*To all whom it may concern:*

Be it known that I, JAMES H. MORLEY, a citizen of the United States, residing at Holyoke, in the county of Hampden and State of Massachusetts, have invented new and useful Improvements in Machines for Sewing Buttons on Fabrics, &c., of which the following is a specification.

My invention consists in mechanism for automatically sewing shank-buttons onto fabrics, shoes, &c.; and the objects of my invention are to form a double-threaded stitch on the top side of the material being sewed upon transversely to the direction of feed, and on the reverse side of the material two parallel lines of stitches at right angles to the first-named ones, to make alternately long and short stitches, and to so feed buttons to be sewed by said machines as to present them at the proper time and in the proper place to be operated upon.

I attain the above-named objects by the devices and construction illustrated in the accompanying drawings, in which—

Figure 1 is a sectional side elevation of my machine, with the take-up and tension removed, including the button-feed, partly in section, the end plate, 34, Fig. 5, opposite the driving-wheel, being removed. Fig. 2 is is a side elevation of the button-feed hopper and valve, partly in section, and the valve-rod in part, and a portion of its operating-arm. Fig. 3 is a cross-section of the button-feed trough. Fig. 4 is an end elevation of the machine and button-feed, with end plate, 34, and cover 47ª, over the end of trough 45, removed. Fig. 5 is a rear elevation of the machine, partly in section, with the button-feed removed. Fig. 6 is a view of the button-plunger, its operating-cam, the button-turning wheel, and the front end of the button-clamp, showing their operative relations. Fig. 6ª is a rear perspective view of the swinging needle-bar frame and attachments. Fig. 7 is a perspective view of the needle-plate. Fig. 8 is a perspective view of the cloth and needle plates combined, and showing the needle-backer thereon. Fig. 9 is a perspective view, showing the tension device, the take-up and its operating-cam, the swinging needle-bar frame and its operating-cams, the needle-bars, the needles, the presser-foot, the helper-bar, the cast-off, and the end plate, 34, of the machine, all in their operative relative positions, and showing the course of the thread from around the tension device to the needle, the needle-plate being partly shown in dotted lines. Fig. 10 is a view of that portion of the swinging needle-bar frame carrying the vertical needle-bar, the cam-plate attached thereto, the disk provided with the crank-stud engaging with said cam-plate, and a part of the crank which actuates the inclined needle-bar. Fig. 11 is an enlarged view of the ends of the cast-off and the hooked needle, showing their operative relation to the loops formed in sewing. Fig. 12 is a view of the open side of the button-clamp, the front end of the clamp-carrier, and its spirally-grooved bearing. Fig. 13 is a view of the parts shown in Fig. 12, but with the button-clamps turned up to receive a button, showing also a section of the button-turning wheel, the button-plunger, and the bottom of the button-feed trough, showing the relative operative position of said plunger, wheel, and button-clamp, when a button (there shown) has been turned around and is being carried into said clamp. Fig. 14 is a perspective view of the end of the button-carrier and button-clamp turned over and holding a button with its shank flatwise toward the vertical needle-point, showing the inclined needle up through the said shank, the vertical needle, the presser-foot, and helper-bar in their relative positions, and a portion of the needle-plate. Fig. 14ª is a front perspective view of the needle-bar frame. Fig. 15 is a longitudinal section, through line *o o* of Fig. 13, of the front end of the button-carrier and clamps, showing the form of the button-clamps within the carrier and the manner of fastening them therein. Fig. 16 is an end elevation of the swinging needle-bar frame, showing an edge view of an actuating-spring attached to frame D, and the outer ends of two feed-adjusting screws working in said frame. Fig. 17 is a view of the swinging needle-bar frame, showing the relative positions of the two needle-bars therein, its pivot-points, the pivoted cam-bearings thereon, and the feed-cams on the end of shaft B, adapted to operate upon said bearings. Fig. 18 is a plan view of the button-turning wheel, with button-pockets therein, and showing the end of the wheel-holder and pawl-hook contiguous to said wheel. Fig. 19 is a perspective view of the button-clamp, the forward end of the button-carrier, with its guide-pin, and the spirally-grooved bearing therefor. Fig. 20 illustrates a modified construction of the button-clamp and delivery end of the button-feed trough, showing a flexible button-stop attached to the latter, and showing, also, the receiving position of the modified button-clamp thereunder. Fig. 21 is a plan view of the modified construction of button-clamp, showing it turned over on its side and a button in the clamp. Fig. 22 is a side elevation of the parts shown in Fig. 21. Fig. 23 is a view of the end of the trough shown in Fig. 20, but with the button-stop in a position to prevent buttons from dropping out of it. Fig. 24 is a sectional view taken through the line 1 2 of Fig. 1, looking in the direction of the arrow.

Like letters and numbers refer to like parts in the various figures.

Upon a suitable frame, D, I mount a shaft, A, adapted to be driven as is any ordinary sewing-machine shaft. Upon said shaft A is fixed a gear, 2, and a cam, 9. Said shaft A has also formed in it a crank, $d$, and on it, beyond said crank, is fixed a crank-disk, 11, in which is fixed a crank-stud, 12.

The gear 2 drives a second shaft, B, through a gear, 3, twice the size of gear 2, fixed to shaft B, which is located above and parallel to the shaft A.

The cam 9 on shaft A operates against the take-up $c$ to move it from said shaft, and a spring, 69, throws it in the opposite direction.

The crank $d$ in shaft A is connected with a pitman, $e$, by a ball-and-socket joint, to permit said pitman to have a vibratory motion.

The crank-stud 12, which is fixed in the crank-disk 11, engages in the cam-slot in the cam-plate 13, which is secured, through a vertical slot in the swinging needle-bar frame $o$, as seen in Fig. 10, to the vertical needle-bar 14, and reciprocating vertical motion is thereby given to said needle-bar by the revolution of shaft A.

The second shaft, B, has fixed upon it a grooved cam, 4, and three other cams, $g\ n\ n'$.

The grooved cam 4, through its engagement with the short arm $5^e$ of a lever, 5, operates to vibrate an arm, $5^a$, fixed on the end of a transverse shaft, 6, rocking in the frame, and to which said lever 5 is secured.

The cam $g$ operates to drive down the button-plunger $h$ by striking against an arm extending from its vertical portion, as seen in Fig. 6, and a spring, $i$, (there shown,) carries the plunger up when released by the cam.

Cams $n$ and $n'$ operate against adjustable bearing-points on the swinging needle-bar frame $o$ to swing it from shaft B with different movements, and a spring, 25, attached to frame D, Fig. 16, operates to throw said frame $o$ toward said cams and against a stop, 29, on the edge of plate 34, Fig. 9.

The swinging needle-bar frame $o$ is pivoted to frame D at $r'$, Figs. 5, 17, and 9, and to plate 34, Fig. 5, at $r$, which latter plate is firmly secured to said frame D. The said needle-bar frame is provided with suitable bearings thereon, as shown, for the inclined needle-bar 10 to slide in, having a slot, 24, Fig. 5, in it directly back of said needle-bar, in which a guide-arm, $f$, attached to the needle-bar slides to prevent the needle-bar from turning. The end of said frame $o$ back of plate 34 is provided with a vertically-grooved face, as seen in Figs. 4, 10, 16, and 17, and in said groove are fitted to slide the flat vertical needle-bar 14, heretofore spoken of, the helper-bar 21, and the cast-off bar 70. In a portion of frame D adjoining said grooved end of the needle-bar frame $o$ is the presser-bar, adjusted to slide in a groove in said frame D. A spring, 28, Fig. 4, draws said presser-bar upward.

On the face of the helper-bar 21, and lying against it and the needle-bar, is pivoted a slotted elbow-lever, 26. A pin, 85, set in the needle-bar, as shown, projects through said slot in lever 26, and the end of the horizontal arm of said lever extends over a pin, 27, in the presser-bar.

The operation of the cast-off 20 and its bar 70 relative to the needle-bar 14 is well known, they being used in this connection in wax-thread sewing-machines.

The operation of the needle-bar, the helper-bar, and the presser-bar, in conjunction with the lever 26, applied as shown in Fig. 4, is set forth in the patent of J. A. Davis, dated October 9, 1866, No. 58,614.

For the purpose of properly securing the different feed-actions of the needle-bar frame $o$, as hereinafter explained, adjustable bearing-points $s\ s'$, against which cams $n\ n'$ strike, are provided, which consist of two arms, as shown, pivoted on frame $o$, in the lower ends of which are placed friction-rollers, against which said cams strike in revolving.

In a projecting block or boss, $t$, on the rear side of frame $o$ are placed two feed-adjusting screws, $v\ v'$, adapted to be screwed against the back sides of the pieces $s\ s'$, to cause their lower ends to project more or less beyond the side of said frame next to the cams $n\ n'$.

The pitman $e$, above mentioned as connected to crank $d$ by a ball-and-socket joint, is connected by its upper end with a collar on the inclined needle-bar 10, Fig. 1, by an arm on said collar, provided with a ball which fits a spherical cavity in said pitman, the latter being divided longitudinally into two parts, which are secured together, and upon the crank and said arm on the needle-bar collar by transverse screws, as shown.

On the frame $o$ are fixed two thread-guide eyes, 16 and 17, as shown in Figs. 1, $6^a$, and 9.

In the vertical needle-bar 14 is secured a hooked needle, 19, and in the inclined needle-bar 10 is secured an eye-pointed needle, which operate with and by the devices herein described, as hereinafter set forth.

The cloth-plate 23, Fig. 8, is secured to the frame D over the needles, as shown in Figs. 1, 4, and 5. This plate is provided with a slot cut from near the front edge to the back edge. In suitable grooves formed in the edges of said slot in the cloth-plate is fitted the needle-plate 32, Fig. 7, and there secured by the removable plate 72. Upon the top of the cloth-plate, just at the rear end of the said slot therein, is fixed the needle-backer 33, provided with two short projecting points, $z'$ $z^2$, reaching out over the said slot, and a point, $z$, at the base of the slot in the needle-plate lies under point $z'$ of the needle-backer when the said plate is in position, as seen in Fig. 8. The needles pass up in the spaces each side of the point $z'$ on the needle-backer.

The purpose of the narrowed part 69 of the needle-plate is explained farther on.

A thread-tension device of ordinary construction is located as shown in Fig. 4.

The lever 5 is connected with the end of a button-carrier, 7, by a ball-and-socket joint, as shown, the said parts being so adjusted one to the other as to allow of the requisite vertical slide in such joint to permit of free movement of the parts while said carrier is moved reciprocally by the action of said lever, and to permit the carrier to rotate reciprocally.

A tubular bearing, 8, is fixed on frame D, through which carrier 7 passes, and in said bearing is cut a spiral groove, $a$, and a screw-pin, $b$, is inserted through said groove into the said carrier, so that when the latter is moved back and forth through said bearing carrier 7 is caused to rotate, as aforesaid. In the end of said carrier opposite to lever 5 are fixed two flexible button-clamps, $x$ $x$, as shown in Figs. 12, 13, 19, and 15, and provided with a button-socket between their projecting ends, as shown in Fig. 12. Said clamps are secured in a socket formed in the end of carrier 7, as seen in Fig. 15. Their shanks, from their cup portions inward, are flexible, their outer sides being straight. On the inner side of each one, near their rear ends, is formed a thick rounded projection, as seen, forming curved bearings for the rear ends of the clamps one against the other. Through the sides of the carrier, and projecting into the said thick portion of the clamps, are inserted four screws, two into each one, as shown in said Fig. 15. The said button-clamps, when they are in a backward position under the button-turning wheel 60, present their open side under one of the cups in said wheel, ready to take a button, and when moved forward they turn one-quarter over, as seen in Fig. 14, actuated by the above-described devices, which control the movements of carrier 7.

To the arm 5$^a$ is connected a pawl-hook, 41, engaging with a series of teeth formed on the periphery of the button-turning wheel 60. The said wheel is pivoted to frame D and adapted to be revolved in a horizontal plane intermittently by the action of said pawl-hook. Attached to any suitable part of the frame is a spring wheel-holder, 59, Fig. 8, adapted to spring behind the teeth on said wheel 60 and prevent it from being revolved backwardly by the forward movement of the pawl-hook. A button-plunger, $h$, whose operating devices have already been described, moves down against a button brought around under it by wheel 60, pushing it into the clamp-jaws $x$ $x$ beneath said wheel.

A button-hopper, 44, Figs. 1 and 2, to receive the buttons to be sewed on, is constructed with an inclined bottom, 73, to cause the buttons to gravitate to the left-hand portion thereof, and in said bottom is cut a passage for the hopper-valve 56 to slide through, said hopper-valve being a short inverted flat-bottomed trough, and above said passage, in said bottom, is a second opening, through which the end of a hopper-valve guard, 57, is moved back and forth with and by the hopper-valve, to which it is attached.

That portion of the top side of the hopper-valve which is exposed under the pile of buttons in the hopper is provided with a single circular opening, 74, and projecting downward from the rear side of this circular opening is a short arm, 75. Attached to the rear side of the hopper, and extending into the end thereof under the arm 75, is a spring hopper-valve bottom, 58, the end of which in the valve is adjustable vertically by bending up and down. When the hopper-valve moves to the left under the mass of buttons in the hopper the end of the hopper-valve guard 57 which projects over the opening 74 in the valve prevents more than one button from passing under it and into the opening in the valve. The spring-bottom 58 is adjusted up or down to give room for a large or small class of buttons. Thus when a button drops through the opening 74 it falls upon the spring-bottom 58, and the returning movement of the valve causes the arm 75 to draw against the button, carrying it out from under the hopper into the straight portion of a feed-trough, 45.

A rod, 52, is secured to the hopper-valve, and passes through a ring, 51, on the end of an arm, 50, which is pivoted to arm 5$^a$, and, reaching up therefrom to the edge of the trough 45, extends across its top. The end of rod 52 is headed, as shown, and a ring, 76, is fixed on it between the head and hopper-valve. Thus, when arm 5$^a$ is vibrated arm 50 is drawn longitudinally back and forth on the upper side of trough 45, causing ring 51 to carry the hopper-valve into the hopper by abutting against ring 76, and to draw it out by striking the head of rod 52. A flexible corrugated strip, 53, is attached pivotally to that portion of arm 50 which lies across trough 45, and has a cross-bar, 54, attached to it to prevent it falling below the edge of the trough, and when arm 50 is moved, as just described, said corrugated strip is moved longitudinally over the buttons in the trough and operates upon them, as hereinafter described.

A light spring, 55, is attached to the hopper, and its free end bears upon the top of the corrugated strip to hold it down.

The hopper-trough 45, to one end of which the hopper 44 is attached, is pivotally secured to frame D at 46, Fig. 1, and is caused to have a limited vibratory movement, in order to facilitate the movement of the buttons, as follows:

A lever, 47, is pivoted on frame D, on one end of which the hopper end of the trough rests, as seen in Fig. 1. A downwardly-bent arm on said lever 47 is arranged to ride on the edge of a serrated segment, 43, secured to arm $5^a$, and when said arm vibrates the hopper and trough are caused to be shaken for the purpose just stated. A continuation of lever 47 reaches up under the trough, as shown, and thereto is attached a spring, 49, to draw said lever against the segment 43.

A trough-cover, $47^a$, is fixed to frame D, and the end of the trough vibrates slightly under it, for the purpose hereinafter explained.

The operation of my sewing-machine is as follows, viz: The thread is passed from the spool around the tension device, thence through the guide-eye 16 on the swinging needle-bar frame o, thence through the end of the take-up, and back through the second guide-eye, 17, on the said swinging frame, and then through the eye of the inclined needle, and the end of the thread is left as in ordinary machines. To sew stitches such as are described below, of uniform length, the cam-bearings $s\ s'$, pivoted on frame o, are adjusted by screws $v\ v'$, so that each one, when operated upon by its cam $n$ or $n'$ on shaft B, will cause the frame o to be swung an equal distance from the center of said shaft B. To sew alternately long and short stitches, either one of said cam-bearings may be adjusted by said screws to cause the needle-bar frame to be swung alternately more and less. The eye-pointed needle is a common Howe sewing-machine needle, and rises through the fabric, the supply-side of it coming against the back-up, which throws the loop in the opposite direction for the hook-needle to take it. The eyed needle is retracted slightly to cause a loop to be formed on the side of it opposite the back-up, as in any ordinary shuttle-machine. The vertical hook-needle rises through the material and passes between the needle and the said loop on the side of it. The frame supporting both needle-bars now swings, causing the needles which are up through the materials to feed the latter along between the needle-plate and presser-foot. The hook-needle is in such position that when the eyed needle moves down the thread drawn by the take-up around the hook-needle will be engaged by the hook. Thus, while one end of the thread is held by the fabric and around the hook-needle, the take-up draws from the spool the requisite quantity of thread for this stitch, yielding the thread up as the hook returns back through the fabric with the loop. The hook now draws the loop down through the fabric and between it and the loop cast off. The take-up has now let off the thread, and the swinging needle-bar frame now returns to its starting-point, actuated by spring 25. The helper-bar begins to rise in advance of the hook-needle against the under side of the fabric, the presser-foot descending simultaneously with the rising of said bar. The latter holds the cloth against the needle-plate while the hook-needle passes through it, and remains against it while the hook-needle draws out, when the presser-foot returns against the fabric, holding it in position, while the swinging frame returns to its starting-point, as aforesaid. The hook-needle penetrates the fabric at a point some distance to one side of the eye-pointed needle, so that the aforesaid movements of the stitching devices produce the first stitch, carrying the thread from one perforation to the other across the upper face of the material in a line transverse to the direction in which the latter is being fed. In forming the next stitch the loop of the first stitch which was drawn down through the fabric, as above described, is held by the hook-needle. The eye-pointed needle now moves upward, drawing its thread-supply from the slack portion of the thread between the tension device and the needle; the hook-needle, around the barbed end of which the first loop still is, follows it in the manner described in making the first stitch, but passing through the said loop. The cast-off follows the upward movement of the hook-needle and passes between the loop of the first stitch and the hook-needle. The hook-needle now descends, as before described, drawing the loop of the second stitch back of the cast-off and down through the loop of the first stitch, which is held open for that purpose by the cast-off. The hook-needle continues to descend, carrying the loop with it, until its point is below the point of the cast-off. The latter then follows, moving down and casting off said loop of the second stitch onto the loop of the prior stitch, as shown in Fig. 11, thereby making a common loop-stitch, the loop of the last stitch being held by the hook-needle, as aforesaid, ready for a succeeding stitch. The said stitch is a double-threaded transverse stitch on the top side of the material, and on the under side thereof there are two parallel lines of stitching.

The hereinbefore-described construction of the take-up devices of this machine operate, conjointly with the swinging frame, to draw such an amount of thread as may be required for the stitch which the machine may be adjusted to make, be it longer or shorter, or alternately long and short stitches, and such conjoint operation is as follows: My take-up begins to draw the thread when the eye of the eyed needle leaves the fabric, the swinging frame, when the take-up so draws, being at its farthest point from the starting-point or stop, and finishes drawing the thread before the swinging frame begins to return to its said starting-point, and as the said frame and take-up now swing toward each other the thread is slacked up and left free for the above-described operation of the hook upon it. The swing of the take-up is uniform, but the points of resistance—i. e., the said two thread-guide eyes on the swinging frame, through which the thread draws in two lines—assume positions at varying distances from the swinging end of the take-up, according to the length of the needle-feed movement, thus causing the length of the thread drawn by the said conjoint action of these elements to be proportionate to the length of the stitch.

To form stitches of different lengths, such as are adapted to sew buttons onto shoes, and so form them to lock the button-stitch into the fabric that the portion of the thread which secures the button shall not be liable to slip, and to feed to the machine automatically shoe-buttons, and cause them to be sewed onto leather or other material at the requisite distances apart, the machine and button-feeding devices operate as follows: The screws $v\ v'$ are turned against the pivoted cam-bearings $s\ s'$, as above described, so as to cause the cams $n'$ $n$ to act upon the swinging frame so that the swinging movements thereof are alternately short and long. The shoe-buttons are fed into the hopper 44, and they fall, one by one, into the hopper-valve 56, through the hole 74 in the top thereof, the action of these parts being properly timed to operate with the sewing-on devices so as to supply a button from the hopper to the feed-trough as often as one is delivered from the lower end of the latter. The shaking of the hopper and feed-trough by the above-described devices, together with the inclined position of the trough, causes the buttons to gravitate toward the delivery end of the trough. When the buttons first emerge from the hopper-valve they lie in the upper flat-bottomed portion of the trough in various positions; but as they pass along to and over that part of it having the V-shaped groove along its bottom, midway between its sides and under the corrugated strip 53, any buttons whose shanks may not have fallen into said V-shaped groove are turned over by said strip in its reciprocating movements, compelling them all to assume a uniform position—i. e., all with their faces up and their shanks in said groove edge to edge. This action of the corrugated strip upon the buttons to place them is owing to the fact that there is room for the buttons to pass under said strip if they are in proper position in the groove, and not be hit by it; but if they lie on their sides or faces they cannot pass under it without being hit by it and turned over. Thus the buttons pass toward the delivery end of the trough 45, the lower end of which has a continuous vibratory motion against the fixed cover $47^a$, preventing the moving column of buttons from clogging in their passage and allowing them to drop freely from the end of the trough.

As above described, the button-turning wheel 60 is located under the end of the trough and over a fixed bottom, 47, cut away on one edge to allow the button-carrier 7 to pass under it and to let a button pass from a pocket in the wheel to the clamp-jaws. Said wheel receives the buttons, one by one, into its pockets, and is turned so far around, after receiving a button and before delivering it, as to cause the shank of that button to lie toward the needles instead of from them, as it did when first dropped into the wheel. When said button has been by said wheel carried around under the button-plunger $h$ the latter will descend, pushing said button through the wheel between the jaws $x\ x$ of the button-carrier, which lie open directly under the pocket in the wheel from which the button has been so conveyed to them, and, slightly forcing said jaws apart, the button is there held, its shank still in the same position as when it was in the trough, so far as the opening through its eye is concerned. The button-carrier now moves forward, turning as it moves, carrying the button forward and turning it one-quarter over, so that the opening through its shank is moved over the point of the eyed needle beneath it, with its narrow portion lying upon the thin part 69 of the needle-plate, Fig. 7, and its head upon the material back of it, the shank lying under the projections $z'\ z^2$ of the needle-backer 33, its outer side lying between the said projections $z'$ of the backer and $z$ of the needle-plate. Thus the shank is in a measure clamped flatwise between said points, which co-operate with the clamp-jaws of the button-carrier to hold the button firmly while the eyed needle passes up through the fabric and the eye of the button-shank.

The above description explains the operation of the machine in conveying a button from the hopper onto the leather or fabric, ready to be sewed on.

In operating the machine to sew on buttons, the operator places the leather between the presser-foot and needle-plate, as heretofore described, and makes a stitch through it before sewing through the shank of the button, this stitch being for the purpose of locking the end of the thread in the leather. The machine now feeds for a short stitch, the button being placed upon the leather, as just described, and the eyed needle passes up through the shank of the button, and the hooked needle, passing up outside of the button-shank and operating as aforesaid, engages with the loop above the button-shank. The machine now feeds the distance required between the buttons; after which the stitch is completed, as aforesaid, and in this case a double thread is drawn down over the button-shank, fastening it there firmly, and the said operations are repeated. The direction of feed of the machine being from the needle-backer 33, the buttons pass out between the sides of the slots in the needle and cloth plates, which lead to the outer edge thereof. The formation of the stitch on the material in a line transverse to the direction of feed of the machine permits the employment of a needle-plate, as described, having in it a slot constituting a clear passage from the point between the needles where the stitch is formed to the outer edge of the needle-plate.

Figs. 20, 21, and 22 show a modified construction of the button-clamp on the end of the button-carrier 7, and illustrate the manner of making a clamp to operate to take a button from the end of the button-feed trough when the latter terminates at the right of the needles, there being attached to the trough a flexible button-stop, 68, and to the machine a stop-plate, 67, to co-operate with the parts of the button-clamp to deliver buttons to the latter and to cause the release of the button when it is carried over the needles to be operated upon. This construction dispenses with the use of the button-turning wheel 60 and its operating devices, and also with the button-plunger h, and operates as follows:

The button-carrier 7 is operated as already described, carrying the button-clamp under the end of the feed-trough, as seen in Fig. 20. In so moving the clamp-head 64 strikes against the end of the button-stop 68, springing it away from under the button-column in the trough, and allowing a button to drop between the head and a spring, 65, the latter having been bent back, as seen in Fig. 20, to allow the button to drop freely therebetween. Said spring 65 is bent into the position seen in Fig. 20 by the impingement of pin 66 against the stop-plate 67, and upon the return movement of the carrier 7 backward spring 65, which is slotted to let the shank of the button project through it, as shown, springs against the button, holding it firmly, and the carrier retires and rolls over into the position seen in Fig. 21, letting the stop 68 spring across the end of the trough, and bringing the shank of the button flatwise over the needles, in proper position to be operated upon by them, and when it is sewed on the feed movement of the leather will cause the button to be drawn out of the clamp.

Having thus described the machine and constructions set forth in the drawings, I wish it to be understood that the same is only one of different mechanisms which I have contemplated, and which may be effectually employed for carrying out the main feature of my invention—to wit, the automatic mechanical sewing of buttons to a fabric. Thus different means may be adopted for carrying the thread through the eye of the button into the fabric—as, for instance, passing the hooked needle through said eye to a position to seize the thread from the straight needle or form a suitable carrier and then draw the loop down through the fabric to be secured beneath by a shuttle or needle thread, or the eye-pointed needle may be used in connection with a loop-spreader and shuttle for carrying a thread through the loop, a single thread or two threads, being used. It will further be understood that wires may be sometimes substituted for threads and that other feed mechanisms may be employed, the needles moving with but not controlling the fabric, as in the construction described.

I claim—

1. The combination, in a machine for sewing shank-buttons to fabrics, of button-feeding mechanism, appliances for passing a thread through the eye of the buttons and locking the loop to the fabric, and feeding mechanism, substantially as set forth.

2. The combination, in a machine for sewing shank-buttons to fabrics, of a needle and operating mechanism, appliances for bringing the buttons successively to positions to permit the needle to pass through the eye of each button, and means for locking the loop of thread carried by the needle to secure the button to the fabric, substantially as set forth.

3. The combination, in a sewing-machine, of two independent needle-bars, needles, and operating devices, a movable frame carrying both needle-bars at an angle to each other, and arranged, as described, so that the needles shall penetrate the cloth at different points on lines transverse to the line of feed, substantially as set forth.

4. The combination, with the frame D, needle-bar frame o, pivoted to frame D, and adjustable cam-bearings s s', of the shaft B, cams n n' on said shaft, and a suitable spring to swing said frame o toward said cams, substantially as and for the purpose set forth.

5. The combination, with the needle-bar frame o, of the needle-bars 10 and 14, the eyed needle 18, the hook-needle 19, and the cast-off 20, helper-bar 21, presser-foot 22, elbow-lever 26, and devices for operating said parts, substantially as and for the purpose set forth.

6. The combination, with swinging needle-bar frame o and the needle-bars 10 and 14, of the crank d, shaft A, and the studded crank-disk on said shaft, pitman e, and the cam-plate 13, substantially as and for the purpose specified.

7. In a needle-feed sewing-machine, the combination, with the needle-plate 32 and the presser-bar operating in the frame of the machine, of the needle-bar frame o, needle-bars 10 and 14 and their needles, the helper-bar 21, and cast-off 20, adapted to be oscillated by and with the needle-bar frame, and actuating mechanism, substantially as and for the purpose described.

8. The combination, in a machine for sewing buttons to fabrics, of button feeding and sewing appliances, substantially as set forth, and feeding appliances and operating mech- 9. The combination, with the frame D, swinging needle-bar frame o, the needle-bars 10 and 14, and their needles carried thereby, said frame o being provided with the thread-guide eyes 16 and 17, and adapted to swing in frame D with different degrees of oscillation, of the thread take-up c, adapted to swing with regular vibratory movements, and appliances for operating the frame o, needle-bars, and take-up, substantially as and for the purpose set forth.

10. The combination, with the cloth-plate 23, having a slot from one edge inwardly therein, as shown, of the slotted needle-plate 32, constructed with the projection z at the base of its slot, and the narrow side 69 at one side thereof, and the needle-backer secured to the top of said cloth-plate and provided with the projections z' and z², substantially as and for the purpose set forth.

11. The needle-plate 32, constructed with an unobstructed passage in it, as shown, from the point between the needles where the stitch is formed to the outer edge thereof, combined with devices for feeding buttons above said plate, and a presser foot below the same, substantially as and for the purpose specified.

12. The combination, with cam 4, shaft B, lever 5, and shaft 6, of the button-carrier 7, having pin b therein, and having the clamp-jaws x x secured in one end thereof, and the spirally-slotted bearings 8, substantially as and for the purpose set forth.

13. The combination, with button sewing appliances, of a trough, appliances for carrying the buttons successively from the trough to the sewing devices, and mechanism for operating said appliances and sewing devices, as set forth.

14. The combination, with the frame D and button-feed trough 45, pivoted to frame D, of the lever 47, spring 49, and the serrated segment 43, arm 5ª, and operating mechanism, substantially as and for the purpose described.

15. The combination, with the trough 45, provided with the longitudinal channel 47ᵇ, adapted to the reception of the shanks of the buttons therein, as shown, of the corrugated strip 53, provided with the cross-bar 54, and mechanism for imparting a reciprocating longitudinal movement to the strip over the said trough, substantially as and for the purpose described.

16. The combination, with the hopper-valve 56, of the headed valve-rod 52, provided with the ring 76, the arm 50, provided with the ring 51, and the arm 5ª, and mechanism for vibrating said arm, substantially as and for the purpose set forth.

17. The combination, with the hopper and feed-trough, of the corrugated strip 53 and the spring 55, secured to the hopper 44, and devices for reciprocating said strip, substantially as and for the purpose set forth.

18. In combination, the hopper 44, provided with the inclined bottom 73, having openings therein, as shown, the hopper-valve provided with the guard 57, the opening 74, and the arm 75, mechanism for operating the hopper-valve, and the spring valve-bottom 58, substantially as and for the purpose set forth.

JAS. H. MORLEY.

Witnesses:
WM. H. CHAPIN,
O. S. PARKHURST.